une) United States Patent
Naik et al.

(10) Patent No.: US 8,073,605 B2
(45) Date of Patent: Dec. 6, 2011

(54) METHOD OF MANAGING POWER FLOW IN A VEHICLE

(75) Inventors: Sanjeev M. Naik, Troy, MI (US); Ashish S. Krupadanam, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 688 days.

(21) Appl. No.: 12/190,648

(22) Filed: Aug. 13, 2008

(65) Prior Publication Data

US 2010/0042304 A1 Feb. 18, 2010

(51) Int. Cl.
*G06F 19/00* (2011.01)
*G01C 21/32* (2006.01)
(52) U.S. Cl. ............ 701/70; 701/22; 701/209; 701/207; 180/65.31; 180/65.29

(58) Field of Classification Search .................... 701/70, 701/22, 209, 207; 180/65.3, 65.29
See application file for complete search history.

(56) References Cited

U.S. PATENT DOCUMENTS

| 7,680,568 B2 * | 3/2010 | Moran | 701/22 |
| 7,689,330 B2 * | 3/2010 | Moran | 701/22 |
| 2002/0188387 A1 * | 12/2002 | Woestman et al. | 701/22 |
| 2005/0228553 A1 | 10/2005 | Tryon | |

* cited by examiner

*Primary Examiner* — Paul N Dickson
*Assistant Examiner* — Marlon Arce (57) ABSTRACT

A vehicle includes a powertrain system having a non-combustion tractive power generating device and a positioning system. A method of managing power flow in the vehicle includes determining a present location and a trajectory of the vehicle, and determining a probability of vehicle braking at a predetermined location within the trajectory of the vehicle. The non-combustion tractive power generating device is operated to manage power flow in the vehicle based upon the probability of vehicle braking at the predetermined location.

20 Claims, 5 Drawing Sheets

METHOD OF MANAGING POWER FLOW IN A VEHICLE

TECHNICAL FIELD

This disclosure is related to managing power flow within vehicles having non-combustion power sources.

BACKGROUND

The statements in this section merely provide background information related to the present disclosure and may not constitute prior art.

Vehicle manufacturers are currently developing vehicles that use non-combustion power sources to generate tractive torque. Exemplary vehicles utilizing non-combustion power sources to generate tractive torque include electric vehicles, hybrid electric vehicles and hydraulic hybrid vehicles.

Hybrid vehicles can utilize a non-combustion power source to achieve improved fuel economy and reduced emission levels over vehicles that utilize only internal combustion engines to provide vehicle propulsion. Hybrid vehicles achieve improved fuel economy and reduced emission by selectively utilizing an internal combustion engine or the non-combustion power source. Exemplary vehicles having non-combustion power sources can convert electrical power through motor/generator units. Motor/generator units can function as a motor to convert electrical power from batteries to provide torque to the transmission, independent from torque input from the internal combustion engine. Motor/generator units can function as a generator to convert kinetic energy from the vehicle transmission to electrical power stored by the batteries. In particular, hybrid electric vehicles can utilize regenerative braking in which the hybrid electric vehicle's speed is reduced by converting kinetic energy from the moving vehicle to electrical power stored in the batteries.

By controlling motor and generator functionality of the motor/generator units, control systems can control the balance between electrical power and internal combustion power utilized by the powertrain. The control systems can maintain the batteries at a state of charge that is within calibrated upper and lower charging limits. The state of charge is a ratio of the amount of electrical charge of a battery to the charge capacity of the battery. The lower charging limit is calibrated such that the battery state of charge is sufficiently high such that the battery can provide a selected amount of torque to the transmission. The upper charging limit is calibrated such that the battery state of charge is sufficiently low to accept charge from regenerative braking.

Global positioning systems hereafter ('GPS') utilize satellites to transmit signals to provide positioning information to GPS devices. Vehicles can utilize the GPS devices to determine a current position on the earth along with related information such as a current speed and a current direction at which the GPS device is travelling.

Map databases include information relating to a geographic region and can perform navigation functions such as determining travel routes to guide a driver within the geographic region. The travel route can include roads, streets or any other type of thoroughfare.

SUMMARY

A vehicle includes a powertrain system having a non-combustion tractive power generating device and a positioning system. A method of managing power flow in the vehicle includes determining a present location and a trajectory of the vehicle, and determining a probability of vehicle braking at a predetermined location within the trajectory of the vehicle. The non-combustion tractive power generating device is operated to manage power flow in the vehicle based upon the probability of vehicle braking at the predetermined location.

BRIEF DESCRIPTION OF THE DRAWINGS

One or more embodiments will now be described, by way of example, with reference to the accompanying drawings, in which.

DETAILED DESCRIPTION

Figure 1:
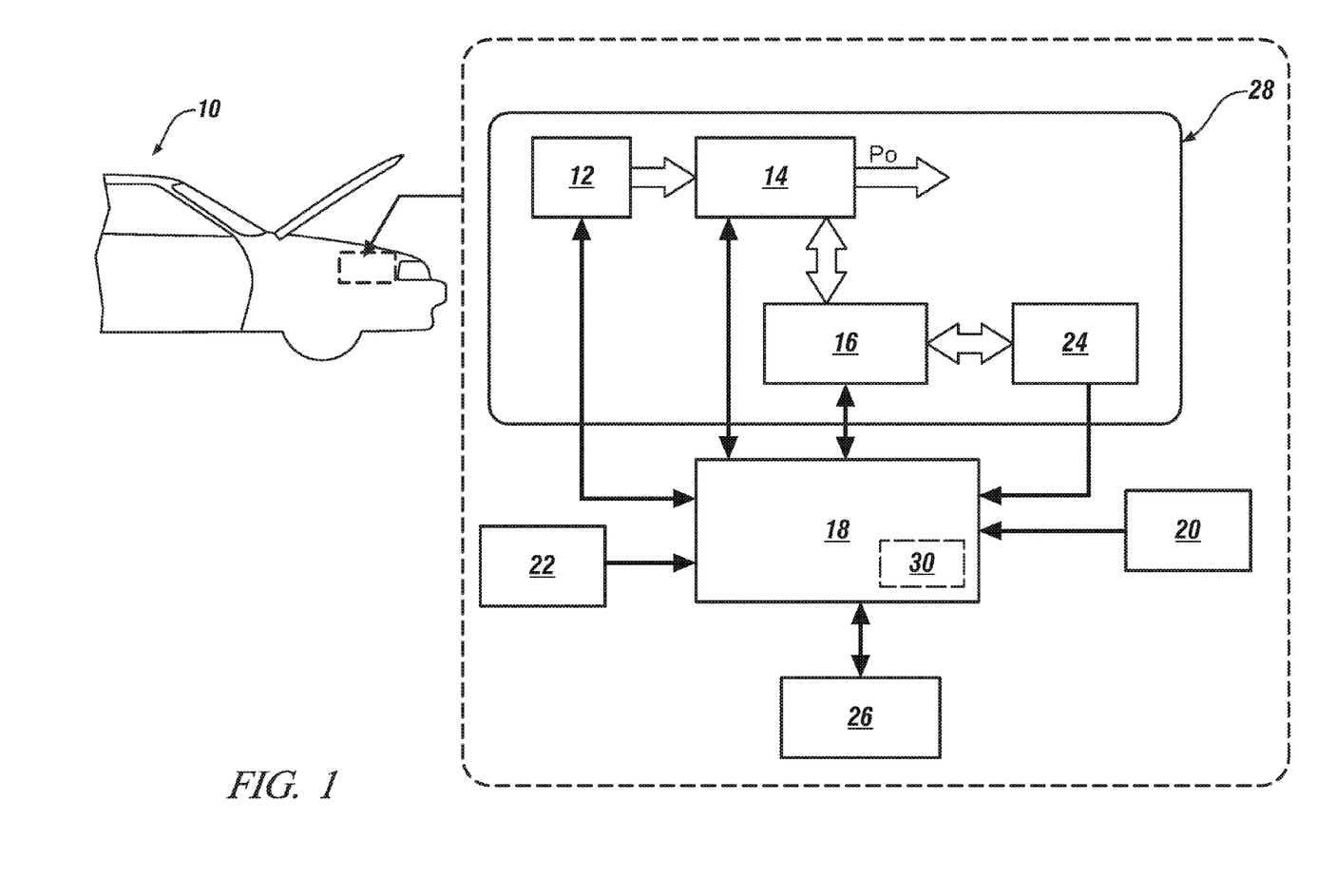
FIG. 1 is a block diagram of a exemplary vehicle in accordance with an exemplary embodiment of the present disclosure.

Referring now to the drawings, wherein the showings are for the purpose of illustrating certain exemplary embodiments only and not for the purpose of limiting the same, FIG. 1 depicts a vehicle 10 comprising a powertrain 28 including an engine 12 and a battery 24. Battery as used herein is understood to include one or more batteries. Although an exemplary embodiment is described herein with reference to the vehicle 10 including a combustion power source, that is, the engine 12, and an electric power source, that is the battery 24, the present disclosure relates to managing power flow in other types of power sources providing non-combustion, tractive power within a powertrain of a vehicle.

As used herein, non-combustion power sources refer to any type of power source in which power is not primarily directly provided utilizing a combustion reaction. However, the non-combustion power sources can provide power that was previously converted utilizing a combustion reaction. Exemplary non-combustion power sources include electrical power storage devices and hydraulic power storage devices.

Although specific embodiments of the disclosure are described in relationship to the vehicle 10, alternate embodiments include other vehicles including vehicles utilizing other non-combustion power sources. For example, alternate embodiments include electric vehicles without a second power source. Further, alternate embodiments include hybrid vehicles comprising other types of power sources, in addition to, or instead of, the electric power sources.

FIG. 1 illustrates the vehicle 10 comprising the powertrain 28 comprising the engine 12, a transmission 14, a motor/generator unit (hereafter 'MGU') 16, and the battery 24. The vehicle 10 further includes a control system 18, a global positioning system (hereafter 'GPS') device 20, a wireless communications system 22, and a traffic sensing system 26.

The exemplary engine 12 comprises a multi-cylinder internal combustion engine selectively operative in several states to transmit power to the transmission 14, and can be either a spark-ignition or a compression-ignition engine. The engine 12 includes a crankshaft (not shown) operatively coupled to the transmission 14. The engine 12 further comprises multiple sensors (not shown) that monitor operating conditions of the engine 12 and communicate with the control system 18.

The exemplary transmission 14 transfers mechanical power between the engine 12, the MGU 16, and the driveline (not shown) to provide an output power ($P_O$) to propel the vehicle 10. The exemplary transmission 14 comprises planetary-gear sets (not shown) and selectively engageable torque-transmitting devices, i.e., clutches (not shown). As used herein, clutches refer to any type of friction torque transfer device including, for example, single or compound plate clutches or packs, band clutches, and brakes. A hydraulic control circuit (not shown) is utilized by the control system 18 to control clutch states such that the transmission 14 can operate in different gear states. Each different gear state provides a preset ratio or a continuously variable ratio of input and output speeds of the transmission 14.

The MGU 16 is configured to receive torque commands from the control system 18 and meet commanded torque levels in motor drive mode or regeneration mode (for example, during regenerative braking). The MGU 16 operates in the motor drive mode to transfer torque to the transmission 14. The MGU 16 operates in regeneration mode to accept torque through the transmission 14 and to convert kinetic energy to electrical power for storage within the battery 24.

The battery 24 is electrically connected to the MGU 16 to transfer electrical power to and from the MGU 16. The battery 24 stores electrical power generated by the MGU 16 when the MGU 16 operates in the regenerative braking mode and supplies electrical power to the MGU 16 when the MGU 16 operates in motor drive mode. Multiple sensors (not shown) monitor and determine parameters of the battery 24 including battery voltage, battery temperature, and available battery power, and the sensors send signals indicative of the parameters of the battery 24 to the control system 18 to determine parameters such as battery state-of-charge.

Although exemplary vehicle 10 utilizes the battery 24 as a non-combustion, tractive power source, other exemplary vehicles can utilize other non-combustion, tractive power sources. In one embodiment, a vehicle utilizes a capacitor or an ultracapacitor as a non-combustion, tractive power source. In one embodiment, a vehicle utilizes a hydraulic accumulator as a non-combustion, tractive power source.

The exemplary control system 18 provides coordinated system control of the components of the vehicle 10 including the engine 12, the transmission 14, the MGU 16, the battery 24, the GPS device 20, the wireless communications system 22, the traffic sensing system 26 and other components of the vehicle 10. The control system 18 comprises a distributed control module system (not shown) configured to synthesize pertinent information and inputs including a speed sensor detecting a current vehicle speed, and execute algorithms to control various actuators to achieve control objectives, including objectives related to fuel economy, emissions, performance, drivability, and protection of hardware. Control modules (not shown) of the control system 18 can include general-purpose digital computers comprising a microprocessor or central processing unit, storage mediums comprising read only memory ('ROM'), random access memory ('RAM'), electrically programmable read only memory ('EPROM'), a high speed clock, analog to digital ('A/D') and digital to analog ('D/A') circuitry, and input/output circuitry and devices ('I/O') and appropriate signal conditioning and buffer circuitry.

The control system 18 preferably includes a map database 30 located in one of the storage mediums (not shown). The map database 30 includes map database information, that is, information relating to a geographic region and information relating to potential travel routes. The potential travel routes can include roads, streets or any other type of thoroughfares on which the vehicle 10 can travel. In one embodiment, the map database 30 includes information associated with potential travel routes including the location of the potential travel routes relative to GPS coordinates, grade and surface feature information, an average speed of a vehicles traveling on the potential travel routes, intersections, that is, intersections with other roads, intersections with pedestrian walkways, and intersections with railroad tracks, traffic signal information associated with the intersection, and like information. The stored information can be updated periodically by, for example, downloading information via the wireless communications system 22. In alternate embodiments, the control system 18 can access the map database 30 through wireless communications with an external computer network without storing the map database 30 within the control system 18.

The GPS device 20 is configured to receive GPS information, that is, a location or global position, a trajectory, and a speed of the vehicle 10. The GPS device 20 sends GPS information to the control system 18.

The wireless communications system 22 receives wireless broadcasts from an external data system. In one embodiment, the wireless communications system 22 can receive broadcasts via a satellite receiver (not shown). In other exemplary embodiments, the wireless communications system 22 can receive wireless communications from other sources (such as, cellular communications transmission, terrestrial radio transmissions, or other wireless transmission sources.) The wireless communications can include encoded data from a computer data network such as, for example, the Internet.

The traffic sensing system 26 is configured to provide traffic sensing system information, including location of other vehicles proximate the vehicle 10. In one embodiment, the traffic sensing system 26 comprises a radar device (not shown) configured to detect other vehicles proximate the vehicle 10. An exemplary radar device can detect other vehicles by transmitting electromagnetic radiation to the other vehicles and measuring properties of the electromagnetic radiation reflected from the other vehicles. The electromagnetic radiation property measurements are utilized by the control system 18 to detect the speed and location of the other vehicles. In one embodiment, the traffic sensing system 26 detects whether another vehicle is in front of the vehicle 10 and whether other vehicles are in either lane adjacent to the vehicle 10. In one embodiment, the traffic sensing system 26 determines a speed and a trajectory of the other vehicles in front the vehicle 10 and other vehicles adjacent to the vehicle 10.

In alternate embodiments, the traffic sensing system 26 can utilize other detection devices, such as lidar devices or camera-based devices, instead of, or in addition to, the radar device to detect the location and the speed of the other vehicles. In one embodiment, the traffic sensing system 26 comprises a lidar device configured to detect the location and the speed of the other vehicles. The exemplary lidar device detects a relative distance and a speed of the other vehicles using laser pulses. The lidar device transmits the laser pulses and photodiodes of the lidar device receive reflected light from the laser pulses and converts the reflected light to electrical signals. In one embodiment, the traffic sensing system 26 includes a plurality of sensors such as a plurality of radar devices, a plurality of lidar devices, or a plurality of sensors including both radar devices and lidar devices.

FIGS. 2, 3, 4, and 5 depict a method of managing a power flow in the vehicle 10 (200) comprising a control strategy 100 for controlling the non-combustion tractive power generating device based on the probability of the vehicle 10 braking at a predetermined location.

The control system 18 can manage power within the powertrain 28 by determining a travel route. The travel route can be determined from potential travel routes from the map database 30. In one embodiment, the control system 18 determines the travel route based on an input trip destination and provides directions to the trip destination to a vehicle operator via a visual display (not shown) such that the vehicle operator can follow the directions when operating the vehicle. In one embodiment, the control system 18 determines a travel route by determining the current trajectory of the vehicle 10 utilizing the GPS device 20.

The control system 18 manages power by, for example, predicting a probability of braking and operating the powertrain 28 in response to the predicted probability of braking. Braking, as used herein, refers to any deceleration event and the control system 18 can receive braking commands from an operator by monitoring signals from a brake pedal (not shown) or an acceleration pedal (not shown). When the vehicle 10 brakes, the MGU 16 operates in regenerative braking mode thereby charging the battery 24.

Figure 2:
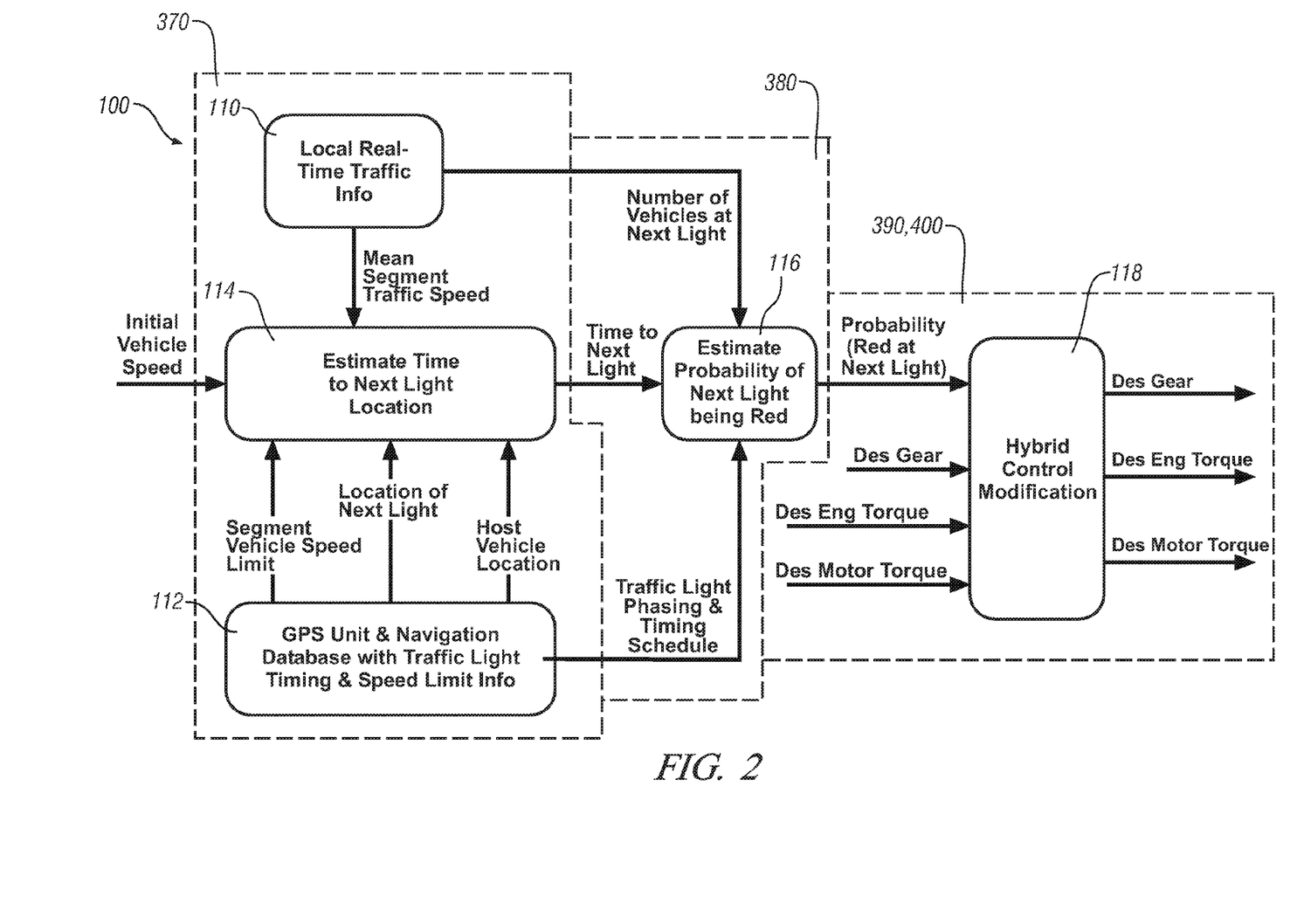
FIG. 2 is a schematic information flow diagram of a control strategy for controlling a non-combustion tractive power device in accordance with an exemplary embodiment of the present disclosure.

FIG. 2 shows the control strategy 100 utilized in the method 200 for controlling non-combustion tractive power in the powertrain 28. The control system 18 accesses traffic information (110). The traffic information includes current traffic level information on a potential travel route. In one embodiment, the traffic level information includes current traffic information measured by traffic sensors (not shown). The traffic sensors are configured to detect an amount of vehicles that travel within defined areas of the potential travel route and average speeds of the vehicles. The traffic information further includes traffic signal information. The traffic signal information includes information associated with set-stop traffic signals and multi-phase traffic signal. Set-stop traffic signals include stop signs and stop lights at which a vehicle is required to stop and therefore the probability that the set-stop traffic signal will indicate stopping is 100%. Multi-phase traffic signals include traffic signals at which a vehicle may or may not stop at depending an indication provided by the multi-phase traffic signal. The multi-phase traffic signal can include transmitters to transmit phasing information. Exemplary traffic signals include single-phase stop lights, multi-phase stop lights, stop signs, train-crossing signals, and pedestrian crossing signals.

The traffic sensors and the traffic signals can transmit traffic information that can be accessed by the control system 18 through the wireless communications system 22 via an external computer network (not shown). In an alternate embodiment, the wireless communications system 22 receives traffic information directly from the traffic sensors and the traffic signals.

The control system 18 accesses the GPS device 20 and the map database 30 (112). The control system 18 receives a current vehicle position of the vehicle 10 from the GPS device 20. The control system 18 accesses the map database 30 to receive travel route information including predetermined locations on the travel route at which the control system 18 can determine a probability of braking and nominal speed information associated with other vehicles on the travel route. In one embodiment, the nominal speed information is based on speed limits of the travel route.

In one embodiment, the control system 18 further accesses the map database 30 to receive estimated traffic levels and estimated traffic signal phasing. The control system 18 can utilize the estimated traffic level and estimated traffic signal phasing when information from traffic signals and traffic sensors is not available. The estimated traffic levels can include traffic level estimates based on average vehicle speeds and on a temporal event such as a time-of-day and a day of the week. The estimated traffic signal phasing can include a probability that the traffic signal will be in a phase that indicates stopping and can further include phasing probabilities based on temporal events.

The control system 18 determines an amount of time until the vehicle 10 reaches the predetermined location (114). In one embodiment, the control system 18 determines the amount of time until the vehicle 10 reaches the predetermined location by utilizing a current vehicle speed, traffic information, information from the GPS device 20, and the map database 30. The current vehicle speed is measured by a vehicle speed sensor (not shown) and is sent to the control system 18. The control system 18 determines a distance (D) along the travel route between the current vehicle location from the GPS device 20 and the predetermined location from the map database 30. The control system estimates a time duration (T) for the vehicle to travel to the predetermined location on the travel route by utilizing equation (1), below:

$$T = \left\{ D + \frac{(V_{lim} - V_0)^2}{2A_0} \right\} \frac{1}{V_{lim}} \quad [1]$$

wherein:
T=amount of time until the vehicle reaches the predetermined location,
D=distance along the travel route between the current vehicle location and the predetermined location,
$V_0$=current vehicle speed,
$V_{lim}$=nominal vehicle speed, and
$A_0$=nominal acceleration.

The nominal acceleration is the average rate of acceleration for the vehicle 10 traveling between the current vehicle speed and the nominal vehicle travel speed, which is calculated by the control system 18.

The control system 18 estimates the probability of braking at the predetermined location (116). In one embodiment, the control system 18 can estimate the probability of braking at the predetermined location utilizing traffic signal phasing information. For example, when the vehicle 10 encounters a green light at a traffic signal, the control system 18 can estimate the probability of stopping at a predetermined location having a second green light along the travel route utilizing equation (2) below:

$$P(Light_{2,state}) = \frac{\min(T_{G1}, T_{G2} - (T - \Delta_{G1to2})}{T_{G1}} \quad [2]$$

wherein:
$T_{G1}$=duration of time that the first signal remains green at a first intersection,
$T_{G2}$=duration of time that the second signal remains green signal at a second intersection,
T=travel time between first intersection and second intersection,
$\Delta_{G1to2}$=phasing of traffic lights between the first intersection and the second intersection, and
$P(Light_{2,state})$=probability that the traffic light at the intersection 2 will be green.

The control system 18 selects and implements a preferred operating strategy of the powertrain 28 (118). In an exemplary embodiment, the control system 18 determines a preferred operating strategy by selecting between a base control strategy and a modified control strategy. When the control system 18 controls the powertrain 28 utilizing a base control strategy, the control system 18 selects a desired gear-ratio of the transmission 14, a desired engine torque of the engine 12, and a desired motor torque of the MGU 16 in response to an operator torque request and based on a base cost calculation. The base cost calculation preferably determines the desired gear-ratio, the desired engine torque and the desired motor torque associated with a lowest overall cost. The lowest overall cost accounts for costs of operating the powertrain 28 including costs associated with having a base state of charge of the battery 24 outside a base state of charge range. The base state of charge range is a state of charge range from a base lower limit to a base upper limit.

When the control system 18 controls the powertrain 28 utilizing the modified control strategy, the control system 18 selects a desired gear-ratio of the transmission 14, a desired engine torque of the engine 12, and a desired motor torque of the MGU 16 in response to an operator torque request based on a modified cost calculation. The modified cost calculation determines the desired gear-ratio, the desired engine torque and the desired motor torque associated with a lowest overall cost. The lowest overall cost accounts for costs of operating the powertrain 28 including costs associated with having a modified state of charge of the battery 24 outside a modified state of charge range. The modified state of charge range is a state of charge range from a modified lower limit to a modified upper limit. The modified lower limit is lower than the base lower limit and the modified upper limit is lower than the base upper limit. Therefore, when the control system 18 is operating in the modified operating mode, the powertrain 28 may utilize a greater amount of battery power to drive the vehicle 10 and to provide the powertrain output torque. The powertrain 28 can utilize greater amounts of battery power by operating the transmission 14 at higher gear-ratios, operating the engine 12 to transmit lower torque levels to the transmission 14, and operating the MGU 16 to either transmit higher torque levels to the transmission 14 or accept higher torque levels from the transmission 14.

Figure 3:
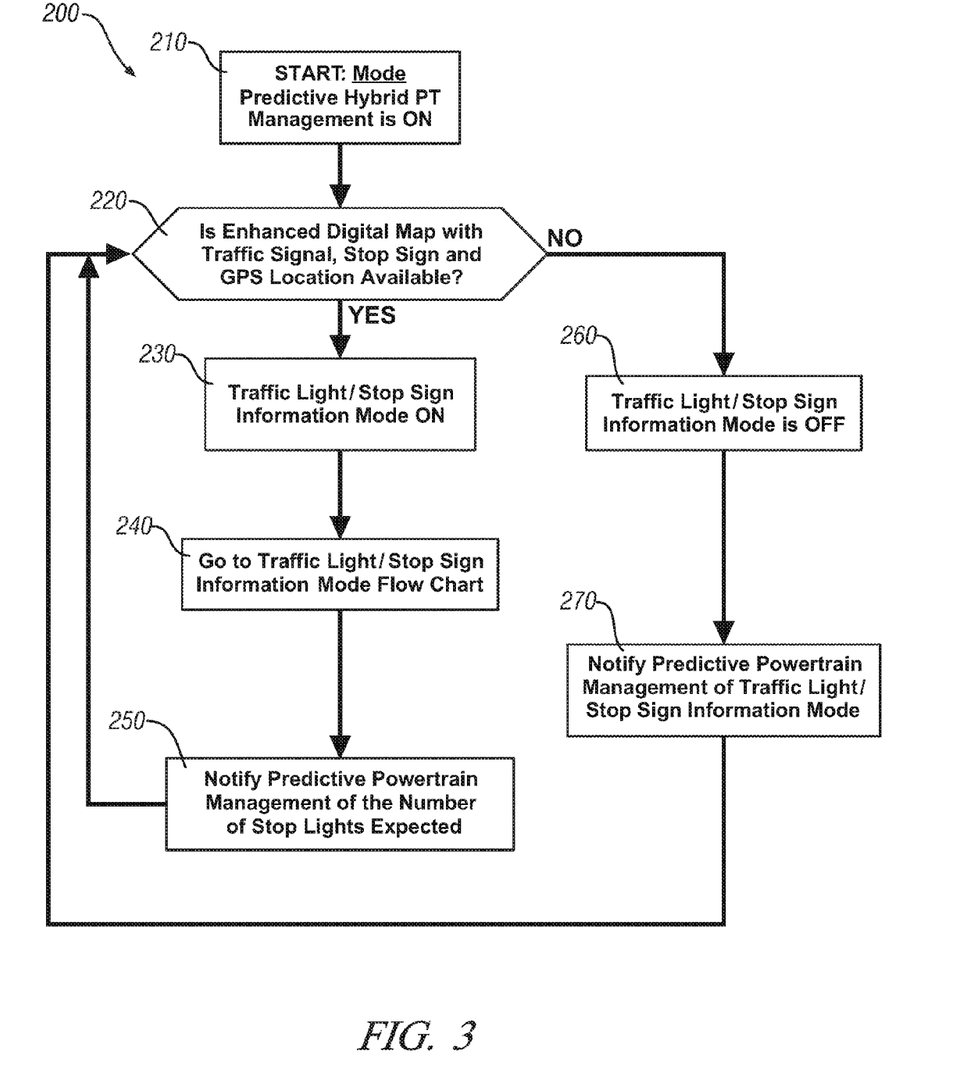
FIGS. 3, 4, and 5 are flow charts illustrating a method for managing power within a powertrain in accordance with an exemplary embodiment of the present disclosure.

FIG. 3 shows the method 200 for managing power within the powertrain 28. The control system 18 initiates the method 200 for managing power within the powertrain (210) by running a predictive management program. In one embodiment, the control system 18 initiates the method in response to an operator command, for example, an operator operating an "on" switch. In one embodiment, the control system initiates the method when a wireless signal is received via the wireless communications system 22.

The control system 18 determines whether the map database information and the GPS location information are available (220). In one embodiment, the control system 18 receives signals comprising GPS coordinates from the GPS device 20. The control system 18 references the GPS coordinates from the GPS device 20 with the map database 30 to determine whether map database information is available for a region associated with the GPS coordinates. In one embodiment, the control system 18 determines whether map database information associated with traffic signals including multi-phase traffic lights and stop signs is available for the region associated with the current GPS coordinates. If the control system 18 determines that the map database information and the GPS location information are available, the control system proceeds to step 230. If the control system 18 determines that the map database information and the GPS location information are not available, the control system 18 proceeds to step 260.

The control system 18 sets a traffic signal information availability variable to indicate that traffic signal information is not available (260) and sends notification to the predictive management program that traffic signal information is not available 270 then continually loops back to step 220 to continually check whether map database 30 information and GPS location information is available.

The control system 18 sets the traffic signal information availability variable to indicate that traffic signal information is available (230) and proceeds to implement the traffic signal information strategy mode (240). The control system 18 then receives information regarding traffic signals present on the travel route (250).

Figure 4:
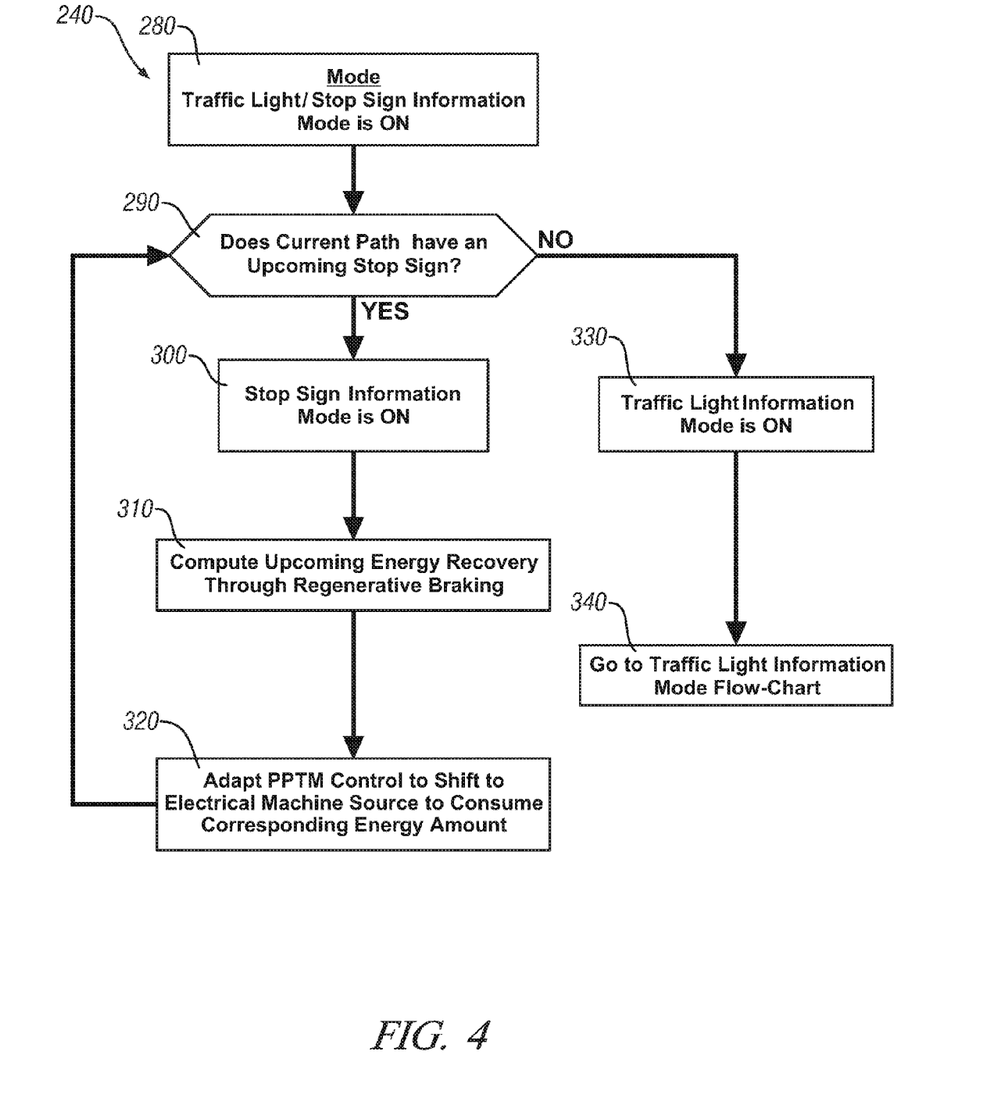

The traffic signal information strategy mode 240 depicted in FIG. 4 is utilized to select a charging strategy when traffic signal information is available. The control system 18 sets a variable to indicate the traffic signal information mode is 'on' (280). The control system 18 determines whether a set-stop traffic signal is the next traffic signal that the vehicle will encounter while traveling on the travel route (290). If a set-stop traffic signal is the next traffic signal that the vehicle 10 will encounter while traveling on the travel route, the control system 18 proceeds to step 300. If a set-stop traffic signal is not the next traffic signal that the vehicle 10 will encounter while traveling on the travel route, then the control system 18 proceeds to step 330.

The control system 18 sets a set-stop traffic signal variable to indicate a set-stop traffic signal mode is active (300). The control system 18 performs an energy recovery level determination to determine an amount of energy that will be recovered at the set-stop traffic signal (310). The energy recovery determination utilizes variables such as vehicle speed, vehicle mass, and a predicted deceleration profile to determine a level of energy that will be recovered through regenerative braking. The control system 18 utilizes the energy recovery determination to determine a control strategy based on the level of energy that can be recovered through regenerative braking (320).

Figure 5:
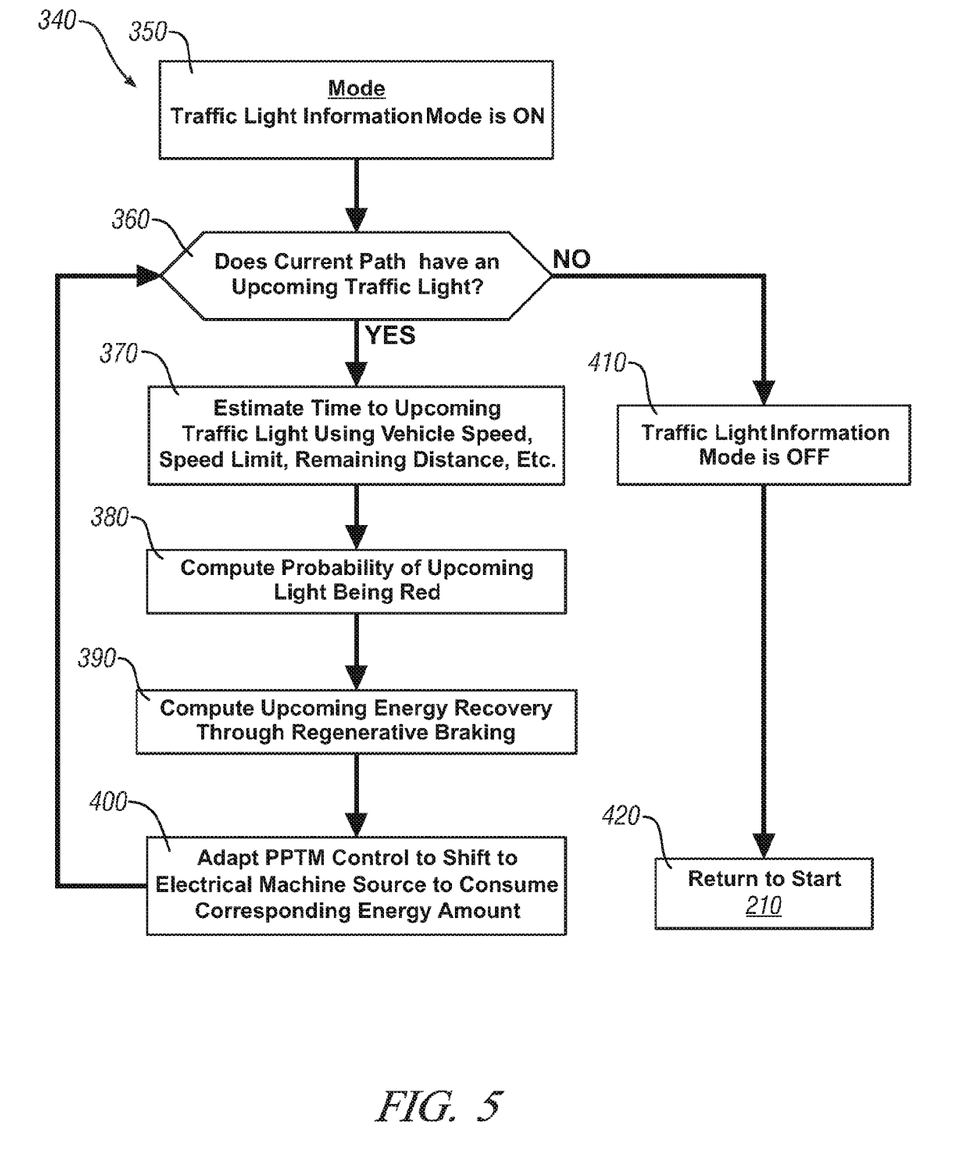

The control system 18 sets a multi-phase traffic signal variable to indicate that traffic signal information is available (330). The multi-phase traffic signal information strategy mode 340 depicted FIG. 5 is implemented to select a charging strategy based on a multi-phase traffic signal. The control system 18 sets a variable to indicate the multi-phase traffic signal information mode is 'on' (350). The control system 18 determines whether a multi-phase traffic signal is the next traffic signal that the vehicle will encounter while traveling on the travel route (360). If a multi-phase traffic signal is the next traffic signal that the vehicle 10 will encounter while traveling on the travel route, then the control system 18 proceeds to step 370. The control system 18 then utilizes the control strategy 100 to estimate the time to the upcoming traffic signal 370, to compute the probability of the multi-phase traffic signal indicating stopping 380, to compute energy recover levels through regenerative braking 390, and to determine a preferred operating strategy 400.

If a multi-phase traffic signal is not the next traffic signal that the vehicle 10 will encounter while traveling on the travel route, then the control system 18 proceeds to step 410. The control system 18 sets a variable to indicate the traffic light information mode is 'off' (410). The control system returns to start of the method 210 for managing power within the powertrain 28 (420).

In other exemplary embodiments, the power can be managed within a powertrain 28 by determining the probability of braking at multiple locations for example multiple traffic signals. In one embodiment, average phasing information of multiple traffic signals is utilized in addition to or instead of current traffic signal phasing information received by the wireless communications system 22.

Further, determining the probability of braking at multiple locations, for example, multiple multi-phase traffic signals can further include determining an amount of traffic signals on the travel route, distance between traffic signals, and average phasing information.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method of managing a power flow in a vehicle including a powertrain system having a non-combustion tractive power generating device and a positioning system, the method comprising:
   determining a present location and a trajectory of the vehicle;
   determining a probability of vehicle braking at a predetermined location within the trajectory of the vehicle; and
   determining an amount of energy that will be recovered through regenerative braking at the predetermined location based on vehicle speed, vehicle mass and a predicted deceleration profile;
   operating the non-combustion tractive power generating device to manage power flow in the vehicle based upon the probability of vehicle braking at the predetermined location and the level of energy that will be recovered through regenerative braking at the predetermined location.

2. The method of claim 1, wherein operating the non-combustion tractive power generating device comprises selecting and implementing a strategy for operating the non-combustion tractive power generating device to manage power flow in the vehicle based upon the probability of vehicle braking at the predetermined location.

3. The method of claim 1, wherein the non-combustion tractive power generating device comprises an electric machine and a battery.

4. A method of managing a power flow in a vehicle including a powertrain system having a non-combustion tractive power generating device and a positioning system, the method comprising:
   determining a present location and a trajectory of the vehicle;
   determining a probability of vehicle braking at a predetermined location within the trajectory of the vehicle;
   operating the non-combustion tractive power generating device to manage power flow in the vehicle based upon the probability of vehicle braking at the predetermined location; and
   controlling a gear-ratio of a transmission of the powertrain system based upon the probability of vehicle braking at the predetermined location.

5. The method of claim 1, comprising controlling a torque level of a motor-generator unit of the powertrain system based upon the probability of vehicle braking at the predetermined location.

6. The method of claim 1, comprising controlling a torque level of an engine of the powertrain system based upon the probability of vehicle braking at the predetermined location.

7. The method of claim 1, comprising determining the current location of the vehicle utilizing geographic coordinates measured by the positioning system and determining the predetermined location by referencing the geographic coordinates to a map database.

8. The method of claim 1, comprising estimating a duration until vehicle braking at the predetermined location.

9. The method of claim 8, wherein estimating the duration until vehicle braking at the predetermined location further comprises:
   accessing traffic information; and
   utilizing the traffic information to estimate the duration until vehicle braking.

10. A method of managing a power flow in a vehicle including a powertrain system having a non-combustion tractive power generating device and a positioning system, the method comprising:
    determining a present location and a trajectory of the vehicle;
    determining a probability of vehicle braking at a predetermined location within the trajectory of the vehicle;
    operating the non-combustion tractive power generating device to manage power flow in the vehicle based upon the probability of vehicle braking at the predetermined location; and
    estimating a duration until vehicle braking at the predetermined location comprising, accessing traffic information comprising assessing current traffic information measured by traffic sensors, and
       utilizing the traffic information to estimate the duration until vehicle braking.

11. The method of claim 1, comprising controlling a state of charge level of the non-combustion tractive power generating device based upon the probability of vehicle braking at the predetermined location.

12. The method of claim 1, further comprising:
    estimating a probability that a traffic signal at the predetermined location will indicate stopping; and
    determining the probability of vehicle braking at the predetermined location based on the probability that the traffic signal at the predetermined location will indicate stopping.

13. A method of managing a power flow in a vehicle including a powertrain system having a non-combustion tractive power generating device and a positioning system, the method comprising:
    determining a present location and a trajectory of the vehicle;
    determining a probability of vehicle braking at a predetermined location within the trajectory of the vehicle;
    operating the non-combustion tractive power generating device to manage power flow in the vehicle based upon the probability of vehicle braking at the predetermined location;
    estimating a probability that a traffic signal at the predetermined location will indicate stopping comprising accessing traffic signal phasing information, and estimating the probability that the traffic signal at the predetermined location will indicate stopping based on the traffic signal phasing information; and
    determining the probability of vehicle braking at the predetermined location based on the probability that the traffic signal at the predetermined location will indicate stopping.

14. The method of claim 13, wherein the traffic signal is one of a single-phase stop light, a multi-phase stop light, a stop sign, a train-crossing signal, and a pedestrian crossing signal.

15. The method of claim 14 wherein the traffic signal phasing information is accessed via a wireless communications system.

16. A method of managing a power flow in a vehicle including a powertrain system including a non-combustion tractive power generating device and a positioning system, the method comprising:
- determining a travel route of the vehicle;
- determining a first predetermined location on the travel route having a first traffic signal;
- determining a probability of braking at the first predetermined location based on a probability that the first traffic signal will indicate stopping;
- determining an amount of energy that will be recovered through regenerative braking at the first predetermined location based on vehicle speed, vehicle mass and a predicted deceleration profile; and
- operating the non-combustion tractive power generating device to manage power flow in the vehicle based upon the probability of vehicle braking at the first predetermined location and the level of energy that will be recovered through regenerative braking at the first predetermined location.

17. The method of claim 16 wherein the probability that the traffic signal will indicate stopping is 100%.

18. A method of managing a power flow in a vehicle including a powertrain system including a non-combustion tractive power generating device and a positioning system, the method comprising:
- determining a travel route of the vehicle;
- determining a first predetermined location on the travel route having a first traffic signal;
- determining a probability of braking at the first predetermined location based on a probability that the first traffic signal will indicate stopping;
- operating the non-combustion tractive power generating device to manage power flow in the vehicle based upon the probability of vehicle braking at the first predetermined location; and
- accessing phasing information transmitted by a traffic signal.

19. The method of claim 16, further comprising:
- determining a second predetermined location on the travel route having a second traffic signal;
- determining a probability that the second traffic signal will indicating stopping; and
- operating the non-combustion tractive power generating device to manage power flow in the vehicle based upon on the probability that the second traffic signal will indicate stopping.

20. The method of claim 16, comprising controlling a torque level of a motor-generator unit of the powertrain system based upon the probability of vehicle braking at the first predetermined location.

* * * * *